United States Patent [19]
Gentry

[11] Patent Number: 5,389,343
[45] Date of Patent: Feb. 14, 1995

[54] CATALYST ASSEMBLY AND METHOD FOR CHEMICAL PROCESS TOWER

[75] Inventor: Joseph C. Gentry, Dallas, Tex.

[73] Assignee: Glitsch, Inc., Dallas, Tex.

[21] Appl. No.: 132,059

[22] Filed: Oct. 5, 1993

Related U.S. Application Data

[63] Continuation-in-part of Ser. No. 927,749, Aug. 10, 1992, Pat. No. 5,277,847.

[51] Int. Cl.$^6$ .............................. B01J 8/04; B01J 8/06
[52] U.S. Cl. .................... 422/191; 422/197; 261/114.1; 261/94; 203/DIG. 6
[58] Field of Search ............. 203/DIG. 6; 261/114.1, 261/94; 422/191, 197; 502/439, 527

[56] References Cited

U.S. PATENT DOCUMENTS

| | | |
|---|---|---|
| 2,403,672 | 7/1946 | Matuszak . |
| 2,526,657 | 10/1950 | Guyer ................................. 502/527 |
| 2,607,663 | 8/1952 | Perry et al. ........................ 502/527 |
| 3,091,586 | 5/1963 | Pappas et al. . |
| 3,121,124 | 2/1964 | Verdol . |
| 3,170,000 | 2/1965 | Verdol . |
| 3,214,247 | 10/1965 | Broughton . |
| 3,270,081 | 8/1966 | Verdol et al. . |
| 3,317,593 | 5/1967 | Enk et al. . |
| 3,410,540 | 11/1968 | Bruckert . |
| 3,489,208 | 1/1970 | Manteufel ........................... 502/527 |
| 3,531,539 | 9/1970 | Tidwell . |
| 3,556,736 | 1/1971 | Boyd . |
| 3,629,478 | 12/1971 | Haunschild . |
| 3,634,534 | 1/1972 | Haunschild . |
| 3,726,942 | 4/1973 | Louder . |
| 3,825,603 | 7/1974 | Massie . |
| 3,846,088 | 11/1974 | Brown . |
| 3,940,450 | 2/1976 | Lee . |
| 3,958,952 | 5/1976 | Ginneken . |
| 3,959,419 | 5/1976 | Kitterman . |
| 4,027,476 | 6/1977 | Schmidt . |
| 4,100,220 | 7/1978 | Bowman et al. . |
| 4,108,218 | 8/1978 | Estes et al. . |
| 4,198,530 | 4/1980 | Wentzheimer et al. . |
| 4,215,011 | 7/1980 | Smith, Jr. . |
| 4,225,562 | 9/1980 | Anderson . |
| 4,232,177 | 11/1980 | Smith, Jr. . |
| 4,242,530 | 12/1980 | Smith, Jr. . |
| 4,275,021 | 6/1981 | Kirkpatrick . |
| 4,302,356 | 11/1981 | Smith, Jr. ..................... 203/DIG. 6 |
| 4,307,254 | 12/1981 | Smith, Jr. . |
| 4,308,233 | 12/1981 | Narumiya et al. . |
| 4,366,407 | 6/1982 | Smith, Jr. . |
| 4,443,559 | 4/1984 | Smith, Jr. . |
| 4,504,426 | 3/1985 | Chuang et al. . |
| 4,543,219 | 9/1985 | Yamato et al. . |
| 4,550,000 | 10/1985 | Bentham . |
| 4,597,916 | 7/1986 | Chen . |
| 4,603,022 | 7/1986 | Yoneda et al. . |
| 4,604,247 | 8/1986 | Chen et al. . |
| 4,956,127 | 9/1990 | Binkley et al. .................... 261/114.1 |
| 5,130,208 | 7/1992 | Maus et al. .......................... 502/439 |
| 5,163,291 | 11/1992 | Hitachi et al. ...................... 502/527 |
| 5,196,612 | 3/1993 | Ward .............................. 203/DIG. 6 |
| 5,235,102 | 8/1993 | Palmer et al. ...................... 502/527 |
| 5,277,848 | 1/1994 | Binkley et al. .................... 261/114.1 |

*Primary Examiner*—Tim Miles
*Attorney, Agent, or Firm*—Johnson & Wortley

[57] ABSTRACT

Improved catalyst assemblies for vapor/liquid contact towers. Bundles of catalyst media used to promote chemical reactions are disposed substantially in the vapor phase of the tower, such as beneath trays therein for improving mass transfer efficiency. Unlike previous assemblies, wherein distillation in conjunction with chemical reaction occurs in the liquid phase or in a mixed phase, the present invention substantially confines the reaction step to the vapor phase. In this manner, the reaction is less obstructive to fluid flow within the tower, promoting better mixing and diffusion of the feed components in the vapor phase. In addition, less turbulence is created and the handling of vapors generated from an exothermic reaction is facilitated. The design and control of the chemical reaction may also be more precise with distinct and separate zones of catalyst media 23 Claims, 4 Drawing Sheets

CATALYST ASSEMBLY AND METHOD FOR CHEMICAL PROCESS TOWER

BACKGROUND OF THE INVENTION

This is a continuation-in-part of U.S. patent application Ser. No. 07/927,749, filed Aug. 18, 1992, now U.S. Pat. No. 5,277,847.

FIELD OF THE INVENTION

The present invention pertains to chemical process towers and, more particularly, to an improved catalyst assembly for enhancement of tower operation.

HISTORY OF THE PRIOR ART

Distillation columns are commonly utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing has been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray through the "active" area thereof. In this area liquid and vapor mix, and fractionation occurs. The liquid is directed onto the tray by means of a vertical channel from the tray above. This channel is referred to as the Inlet Downcomer. The liquid moves across the tray and exits through a similar channel referred to as the Exit Downcomer. Such downcomers are located where there is a sufficient volume of liquid to effect a liquid-phase, chemical reaction, in the case of catalytic distillation. The location of the downcomers determine the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor/liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area, otherwise the channel will become too small. This can restrict the flow of the liquid and/or restrict the disengagement of vapors retained in the liquid or generated in the downcomers, cause liquid to back up in the downcomer, and thus prematurely limit the normal maximum vapor/liquid handling capacity of the tray.

A variation for increasing the Bubbling Area and hence vapor/liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of said tray.

The technology of gas-liquid contact addresses many performance issues. Examples are seen in several prior art patents, which include U.S. Pat. Nos. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. Another reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor/liquid contact in tray process towers. U.S. Pat. No. 4,504,426 issued to Carl T. Chuang et al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

A more recent use of distillation columns is for simultaneous or stagewise fractionation in conjunction with a chemical reaction. According to Le Chatelier's Principle well known in the chemical industry, the kinetics of a chemical reaction can be improved by changing the equilibrium of the reactants with the products. For example, the mechanical designs seen in U.S. Pat. Nos. 3,629,478 and 3,634,534 illustrate distillation column reactors with catalyst in the downcomers. In the case of an exothermic reaction with gaseous product being generated, the vapor disengaging space at the entrance to the downcomer could become grossly overloaded causing the entire tower to fail in its intended distillation function. One operational consideration is thus venting of the gases generated within the downcomer, as well as those entrained from the tray deck. Such considerations must be addressed when maximizing tower operational efficiency. These considerations are addressed in above-referenced copending patent application Ser. No. 07/927,749.

Also according to Le Chatelier's Principle, the equilibrium of a chemical reaction can be shifted from the feed components to the products by removal of the product from the reaction mixture. In many cases, the product is removed from the residual feed by subsequent distillation. The present invention allows the reaction and production separation to be accomplished in the same vessel, allowing for a more complete chemical reaction and reduced capital costs. In cases where the reaction is exothermic, the heat of reaction can be directly applied to the product recovery step. Unlike previous systems where distillation in conjunction with chemical reaction occurs in the liquid phase, as set forth in copending patent application Ser. No. 07/927,749, the present invention confines the reaction step to the vapor phase. There are numerous advantages of vapor phase reaction in conjunction with distillation and these will be set forth herein.

It would be an advantage therefore to provide a method of and apparatus for enhanced distillation utilizing vapor phase catalytic reaction. Such an assembly is provided by the present invention wherein catalyst is suspended both in conjunction with tray decks and in conjunction with packings used in chemical process towers. In this manner, the catalyst region is less obstructive to fluid flow than in systems where the chemical reaction occurs in a liquid phase. There is better mixing and diffusion of the feed components in the vapor phase. Also with the present invention, there is less turbulence and easier handling of vapors generated from an exothermic reaction. Furthermore, the vapor phase catalytic reaction offers the process designer a different set of operating conditions to more easily circumvent the formation of certain azeotropes.

SUMMARY OF THE INVENTION

The present invention pertains to chemical process towers and to catalyst assemblies for use therein. More particularly, one aspect of the invention includes an improved catalyst assembly for a process column of the type wherein liquid flows downwardly through random or structured packing and/or across process column trays. Vapor flows upwardly in such columns for interaction and mass transfer with the descending liquid therein. The improvement of the present invention comprises the placement of catalyst media either within vapor risers of the column trays and/or below tray decks throughout the reactive distillation zone of the column. In this manner, there is enhanced mixing and diffusion of the feed components in the vapor phase and the design and control of the chemical reaction can be more precise.

In another aspect, the present invention includes an improved tray assembly for a process column of the type utilizing catalyst media therein. The improvement comprises means associated with the trays for the support of catalyst media beneath the trays for facilitating the interaction with vapor rising upwardly and passing through the trays. The catalyst support means may comprise a basket secured to the underside of the trays by attachment means. The basket may be constructed of a plurality of elongated wire sections configured for securement to the underside of the tray in engagement therewith for disposing the catalyst media substantially in the vapor flow region thereof. The attachment means may comprise a metal frame built into the tray deck, which supports the catalyst-containing apparatus. The frame may be connected by detachable bolts.

In yet another aspect, the invention includes a method of utilizing catalyst media within a process column of the type utilizing the catalyst media for the enhancement of product interaction therethrough, the column being of the type wherein liquid flows downwardly to engage vapor flowing upwardly for interaction and mass transfer with the liquid. The improvement comprises the steps of disposing the catalyst media in a region of the column devoted substantially to vapor flow therein and the step of substantially excluding liquid flow through the catalyst media. In this manner, the reaction step of the product is substantially confined to the vapor phase. The process also includes the step of constructing the process column with a plurality of trays disposed therein for facilitating the flow of liquid thereacross and the upward flow of vapor therethrough and the step of disposing the catalyst media beneath the trays substantially in the vapor region of the column.

In another aspect, the above described invention includes the step of providing baskets for securement to the underside of the trays and the step of mounting the catalyst media within the baskets beneath the trays for receiving the upward flow of vapor therethrough. The column may also be constructed with trays having vapor risers disposed therein, the step of channeling the ascending flow of vapor within the column through the vapor risers, and the step of disposing the catalyst media within the vapor risers.

In yet another aspect, the invention includes the installation of catalyst in the upper most vapor zone of a mass transfer column. In this particular position, the catalyst layer may be positioned across the entire cross section of the tower and supported therein by a grate or a similar support means. In this position, a separate reactor vessel is not needed for the generation of a vapor phase reaction in the overhead stream. This configuration also makes more efficient use of process heat integration by avoiding the need to revaporize a stream to effect the vapor phase reaction. Also, in the case of an exothermic reaction, additional heat recovery may be realized for condenser systems which generate process steam. In the case of an endothermic reaction, the required duty and size of the overhead condenser can be lessened, reducing the capital cost and the cost of operation.

In yet another aspect, the present invention includes the utilization of the catalyst layer of the present invention secured in any substantially vapor-only zone of a process column vessel so that the reaction operation occurs substantially in the vapor phase. For example, the catalyst may be installed in a lower region of a process column above the vapor feed and wherein a liquid collector tray is disposed thereabove. The distinguishing feature of the present invention is that the reaction zone is substantially in a vapor phase environment while vapor/liquid contact occurs in a separate zone of the vessel. It may thus be seen that by disposing the catalyst media in a substantially exclusively vapor phase region of the vessel, maximum efficiency can occur without deleterious effects on the operation efficiency thereof.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
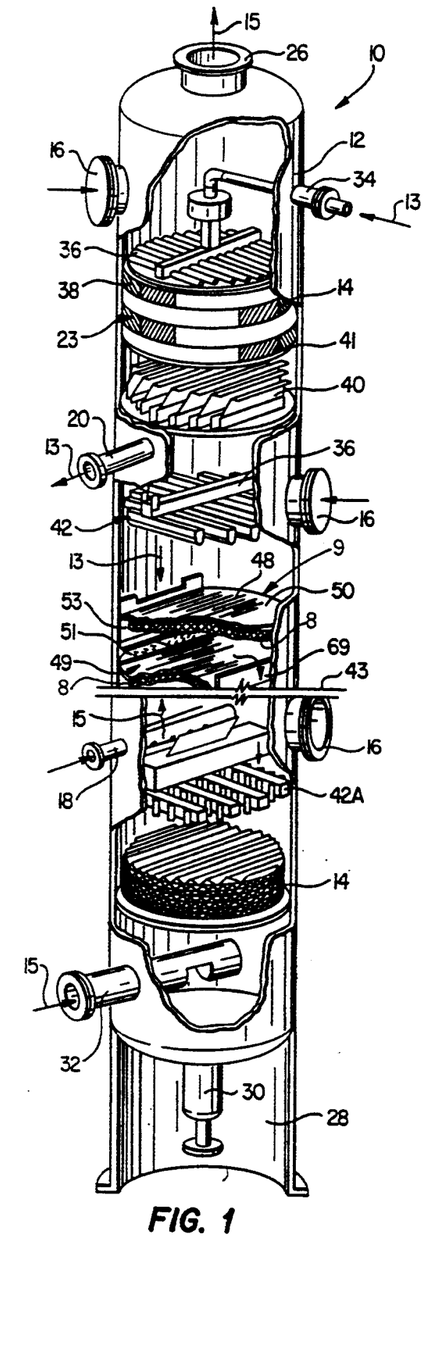
FIG. 1 is a perspective view of a packed column with various sections cut away in illustration of a variety of tower internals and one embodiment of a catalyst-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved catalyst assembly of the present invention. The exchange column 10 of FIG. 1 comprises a cylindrical tower 12 having a plurality of packing bed layers 14 and trays 9 disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 12.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return line 32 is shown disposed above the skirt 28 for recycling vapor therein upwardly through the trays and/or packing layers 14. Reflux from condensers is provided in the upper tower region 23 through entry line 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing bed 38. A liquid distributor 42, adapted for redistributing liquid 13, is likewise disposed therebeneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays 9 is also shown for purposes of illustration. In many instances, process columns contain only packing, only trays, or combinations of packing and trays. The present illustration is, however, a combination for purposes of discussion of the overall tower and its operation in accordance with the present invention. A trayed column usually contains a plurality of trays 48 of the type shown herein. In many instances, the trays 48 are valve or sieve trays. Such trays comprise plates which are perforated or slotted in construction. Slotted trays are shown herein for purposes of illustration only as other styles may be used. The vapor and the liquid engage at or along the trays 48 and, in some assemblies, are permitted to flow through the same openings in a countercurrent flow arrangement. Optimally, the vapor and liquid flows reach a level of stability. With the utilization of downcomers, to be described in more detail below, this stability may be achieved with a relatively low flow rate permitting the ascending vapor to mix with the descending liquid.

In the present embodiment, cross-flow trays 48 and 49 and downcomers 53 and 69 are illustrated. Tray 48 is of conventional design manifesting a conventional perforated, or slotted, surface 50. However, a catalyst layer 8 has been suspended below tray 50, in accordance with the present invention. Tray 49 disposed thereunder includes a raised inlet area or section 51 beneath downcomer 53, and a catalyst layer 8 has also been suspended beneath tray 49. Only a portion of the catalyst layer 8 can be seen in this view, but it will be illustrated in more detail below. The anatomy of process columns of the general type shown in FIG. 1 is likewise described in more detail in an article by Gilbert Chen, entitled "Packed Column Internals" appearing in the Mar. 5, 1984 edition of Chemical Engineering, incorporated herein by reference. This publication does not, of course, address the catalyst layer of the present invention.

Figures 2, 3:
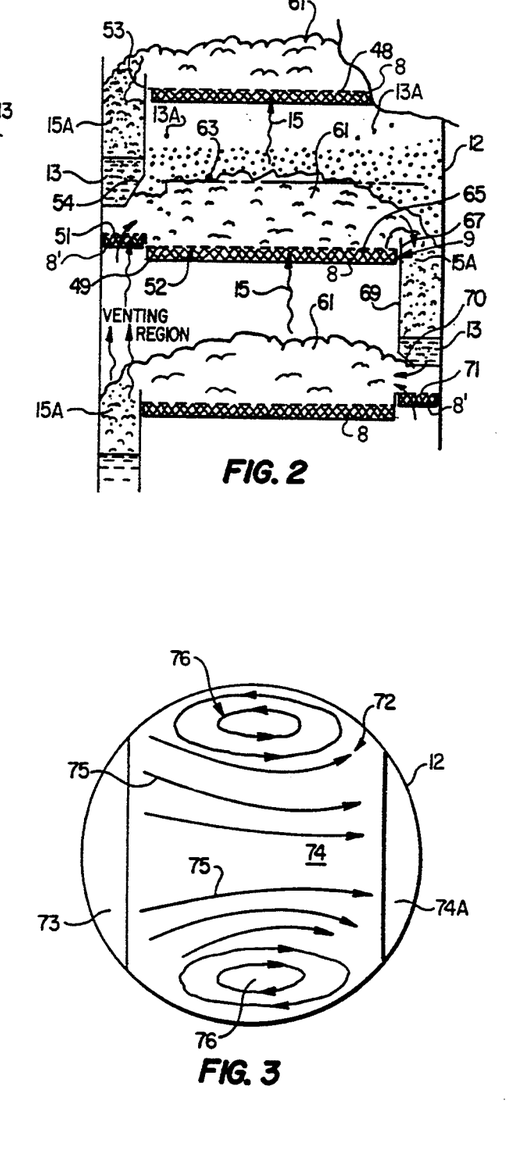
FIG. 2 is a diagrammatic, side-elevational, cross-sectional view of the catalyst-tray assembly of the present invention secured within a process tower and illustrating the flow of liquid and vapor relative thereto.
FIG. 3 is a top-plan, diagrammatic view of a prior art sieve plate illustrating the liquid flow thereacross.

Referring now to FIG. 2, there is shown a side-elevational, cross-sectional, diagrammatic view of several aspects of the present invention. An upper tray 48 comprises a planar panel that is perforated, as shown. The lower tray 49 is also of generally planar construction across its central active area 52. Liquid 13 travels from tray 48 disposed thereabove down downcomer 53 and out bottom section 54. Vapor 15 is often generated or trapped in the liquid 13, as indicated by vapor bubbles 15A shown in the downcomers. The tapered sections 54 of the downcomers shown herein provide clearance angles for vapor flow from the active inlet areas, which clearance angles afford horizontal flow vectors to the vapor vented through raised inlet area 51 and 71. The liquid 13 engages the vented vapor 15 discharged from the raised inlet area 51 beneath the downcomer 53. The venting region therebeneath is so labeled. Entrained gas escaping from the lower downcomer, and/or excess gas from the tray area adjacent thereto, is able to ascend directly into and through the raised inlet area 51. This engagement controls the direction of vented vapor and liquid flow across the central active area 52 of tray 49. The taper of the mitered section 54 also imparts a horizontal flow characteristic. The raised inlet area 51 permits any excess vapor pressure to be vented through the panel and into a flow configuration which facilitates proper tower operation rather than creating more problems. For example, as described below, entrained liquid 13A is induced to drop out due to the flow configuration. The remaining ascending vapor 15 passing through the plurality of perforations 59 of said active region 52 may rise vertically to create a froth 61. The froth or "foam" is a region of aeration in which the phase of the liquid 13 is continuous. When the froth 61 does not exist or becomes discontinuous, an inversion to a gas-continuous regime can result in a "spray" of gas upwardly therethrough. With the downcomer-tray assembly as described herein, the likelihood of this gas continuous regime is greatly reduced.

Still referring to FIG. 2, the froth 61 extends with a relatively uniform height, shown in phantom by line 63 across the width of the tray 49 to the opposite end 65 where a weir 67 is established for maintaining the froth height along line 63. The accumulated froth at this point flows over the top of the weir 67 into associated downcomer 69 that carries the froth downwardly into a mitered region 70 where the liquid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, wherein the downcomers and raised, active inlet areas may be positioned in intermediate areas of the trays. The catalyst media 8 may be disposed in any substantially exclusive vapor region of the column or tray, which could include the region beneath the raised inlet area 5 as shown by catalyst area 8' or other areas as described below. Also, by increasing the total active area by active inlet areas 51 and 71 greater capacity and efficiency are achieved. The manner of flow of the liquid 13 across the tray 49 is likewise critical to tray efficiency. A flow diagram of a conventional sieve plate will be discussed below.

Referring still to FIG. 2, the catalyst layers 8 and 8' are shown disposed beneath the trays 9 of this illustration. Catalyst layers 8 and 8' are suspended beneath each tray in a position for receiving the upward flow of rising gas or vapor 15, as described above. The interaction of the vapor with the catalyst contained within the layers 8 and 8' is not obstructive to fluid flow and promotes better mixing and diffusion of the feed components in the vapor phase. As shown herein, there will be less turbulence and easier handling of vapors generated or superheated from any exothermic reaction occurring therein. The vapors would then be permitted to pass upwardly through the trays (including the raised active inlet areas 51 and 71) as previously discussed. Any excess vapor may then be vented through the active inlet areas 51 and 71 of the trays as described above. This configuration further facilitates reactions that are thermodynamically favored in the vapor phase. As shown herein, the catalyst layers 8 and 8' are disposed entirely in a region of the tower that is substantially relegated to vapor passage. The design and control of the chemical reaction can thus be more precise with distinct and separate zones of replaceable catalyst media disposed therein.

Further to the discussion of the catalyst layers 8 above, it should be noted that according to Le Chatelier's Principle, the equilibrium of a chemical reaction can be shifted from the feed components to the products by removal of the product from the reaction mixture. In many cases, the product is removed from the residual feed by subsequent distillation. The present invention, as described above, allows the reaction and product separation to be accomplished in the same vessel, allowing for more complete chemical reaction and reduced capital cost. In cases where the reaction is exothermic, the heat of reaction can be directly applied to the product recovery step. As presented herein, these advantages are provided by the catalyst layers 8 suspended below the trays 9 throughout the reactive distillation zone of the column. The design variables effecting the pressure drop and the tray spacing will, of course, be adjusted in accordance with conventional technology to allow for the catalyst layer. Further explanations should not be necessary because such designs are within the technical ability of a man skilled in the art. The active panels of the trays 9 could also be of any conventional type, although a sieve tray is shown herein. A convenient means of installing the catalyst layers 8 and 8' would be via removable manways allowing for quick replacement of deactivated or coked catalyst sections 8.

Referring now to FIG. 3, there is shown a flow diagram across a conventional sieve plate. The prior art sieve plate 72 is illustrated herein as a round tray having a first conventional downcomer for feeding liquid upon a solid, underlying panel 73 and then to the tray 74. A second downcomer 74A carries liquid away from the tray. A plurality of arrows 75 illustrate the non-uniform flow of liquid 13 across a conventional plate. Recirculation cells 76 are shown to be formed on both sides of the plate lateral to the direction of flow. The formation of these retrograde flow areas, or recirculation cells, decreases the efficiency of the tray. These recirculation cells are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced, co-pending patent application Serial No. 07/304,942, now abandoned.

Figure 4:
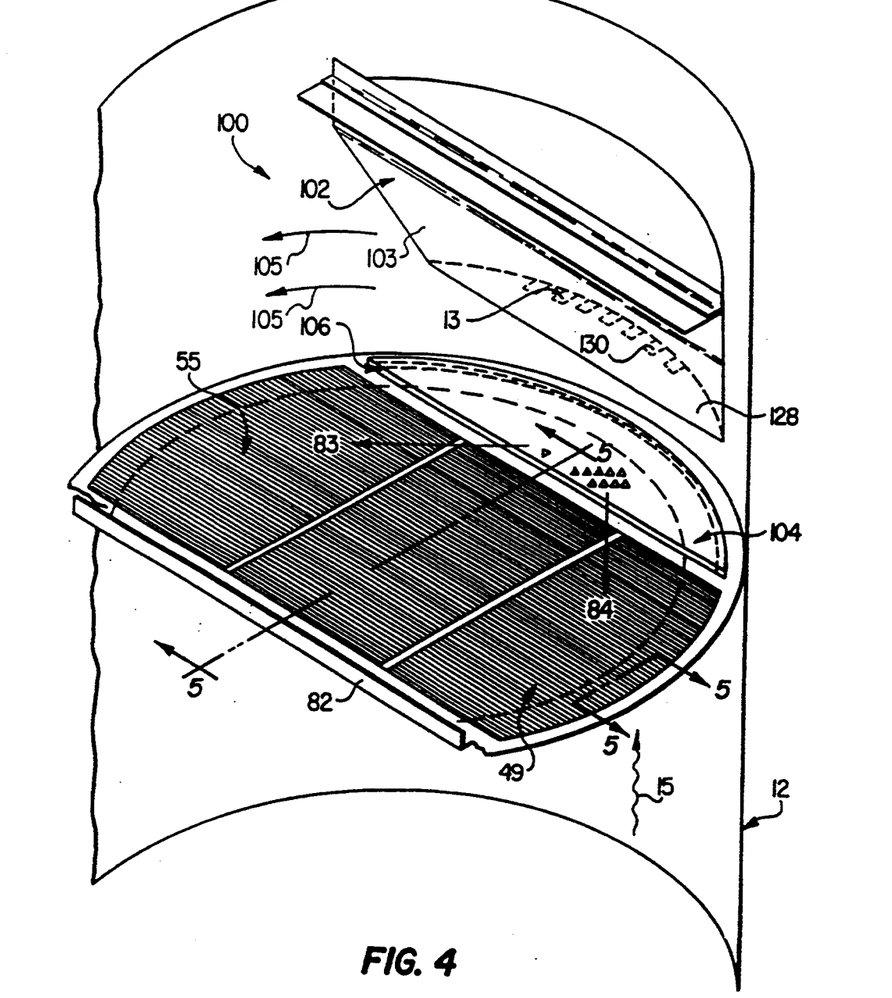
FIG. 4 is a perspective view of a downcomer-tray assembly with portions thereof cut away for purposes of clarity.

Referring now to FIG. 4, there is shown an enlarged, fragmentary perspective view of a downcomer-tray assembly 100 illustrating various flow characteristics. The tray 49 as shown herein is constructed for placement in the tower 12 whereby a feeding downcomer 102 having an inclined face 103, can be disposed over an inlet region 104 for providing liquid 13 to tray 49. A weir 82 is disposed on the opposite side of tray 49 whereby a second downcomer is disposed for carrying froth 61 and liquid 13 away from the tray 49. Liquid 13 spills down upon active inlet panel 104 and over upstanding edge 106 onto the tray 49. The liquid 13 flows across the tray in the direction of arrows 83 and 84. If the panel 104 is constructed with flow vanes, the flow directions will be induced by vapor flow from panel 104 and will be substantially uniform and without the backflow problems discussed above. Arrows 105 reflect the horizontal flow characteristic of the vapor vented from the underlying tray, which flow characteristic is produced by the panel 104 and the inclined face 103. In this manner, two distinct advantages may be recognized. The absence of back mixing will increase the concentration-difference driving force for mass transfer between the counterflowing streams. The horizontal vapor flow aspect represented by arrows 105 will facilitate the dropping out of liquid droplets entrained in the vapor flow 105. Such entrainment is common in towers with ascending vapor flow, but it is exacerbated with the venting flow arising from the inlet panel 104.

Figure 5:
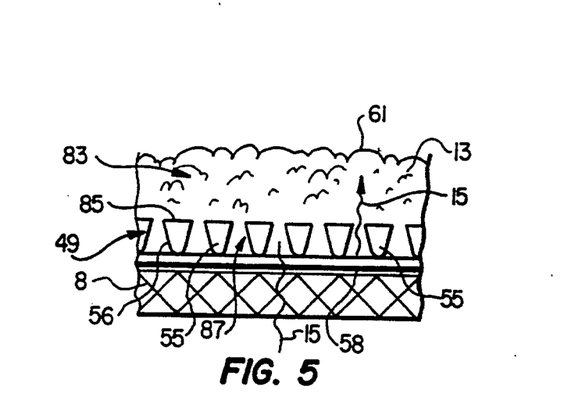
FIG. 5 is an enlarged, side elevational, cross sectional view of an active tray area taken along lines 5—5 of FIG. 4.

Referring now to FIG. 5, an enlarged, cross section of the tray assembly 49 and catalyst layer 8 is diagrammatically shown. In this embodiment, a sieve type tray is constructed with trapezoidal, or V-shaped, wires 55. It is incorporated into a SCREEN TRAY type sieve tray embodiment. SCREEN TRAY is a trademark of the assignee of the present invention and represents the central active area of tray 49 constructed with the array of V-shaped wires 55 disposed in generally parallel spaced relationship. The adjacent V-shaped wires 55 are secured by cross members 58 and form a "Venturi" shaped slit 87 between each of the wires resulting in very low energy loss. The relative size of the mesh 51 and tray 49 are not to scale and are presented by illustrating the tray assembly. Each wire 55 has a trapezoidal outer perimeter surface 56 forming the above defined tapered slit 87. Such a tray operates in the froth regime at maximum efficiency over a wide range of conditions. Gas 15 is thus shown rising from the catalyst layer 8 to engage liquid 13 flowing orthogonal thereto from the downcomer 102 of FIG. 4. The result is a turbulent pattern of gas and liquid engagement effecting efficient mass transfer. Likewise, froth height is maximized, entrainment is minimized and low pressure drop results in reduced downcomer backup. The directionalized flow from the raised, active inlet panel 104 provides an enhancement in tray efficiency, with minimum height. It should also be noted that any style of apertures could be incorporated into the active area of tray 49. Although V-shaped wires are shown, bubble cap trays, other slotted openings, perforations, valves (both fixed and moveable) could be used with the present invention.

Referring still to FIG. 5 the catalyst layer 8 is shown disposed immediately beneath the tray 49. The actual manner of support of the tray is not shown herein in view of the fact that this particular illustration is diagrammatical only. It may be seen that ascending vapor 15 travels upwardly to engage the catalyst area 8 for interaction therein and is permitted to pass upwardly then through the tray 49 to engage the liquid 13 flowing thereacross. In this particular illustration it may be seen that the ascending vapor flow 15 and engagement with the catalyst layer 8 does not create an obstruction to fluid flow and also promotes better mixing and diffusion of the feed components solely in the vapor phase.

Figure 6:
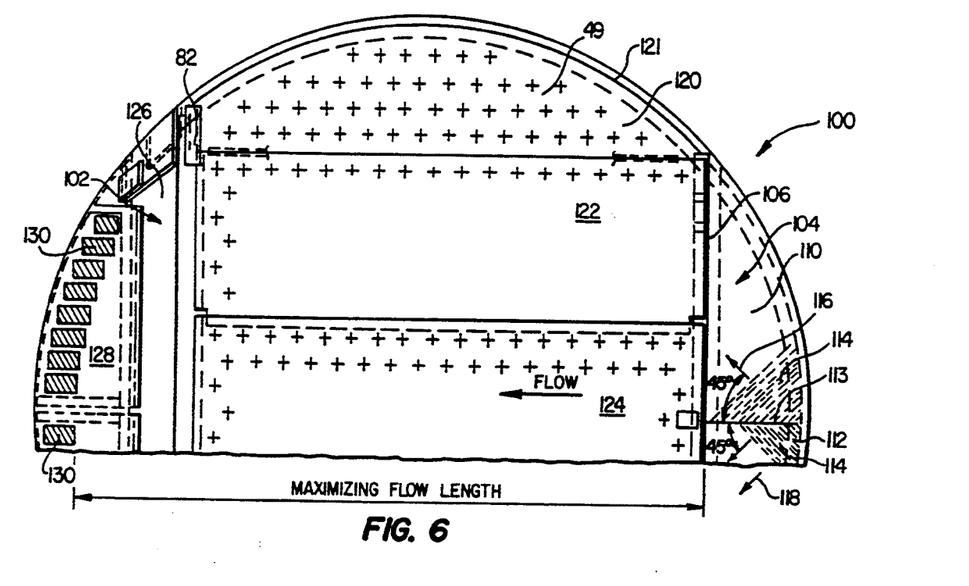
FIG. 6 is an enlarged, top plan view of the tray assembly of FIG. 4.

Referring now to FIG. 6, there is shown an enlarged top plan view of the tray 49 of FIG. 4 illustrating additional flow aspects thereof. The tray 49 is constructed with a plurality of panel sections. These sections are not shown with aperture detail for purposes of clarity. Section 120 comprises an outer panel having an arcuate side wall 121. Panel 122 is secured adjacent panel 120 and is comprised of a generally rectangular configuration. Panel 124 is likewise secured adjacent panel 122 and likewise comprises a generally rectangular configuration. Each of the panels 120, 122 and 124 are constructed of the appropriate tray material such as the sieve tray construction shown in FIG. 5. It may be seen that upstanding edge 106 is shown separating the panels 122 and 124 from the raised inlet panel 104.

Still referring to FIG. 6, the relative proportion of sizes between active inlet panel 104 and the central active area of tray 49 can be seen. Panel 104, in this particular embodiment, is comprised of first and second panel sections 110 and 112 which are welded together across abutting joint 113. Each panel 110 and 112 is constructed with louvers 114 facing in selected directions. Louvers 114 of panel 110 are angled to vector vapor flow in the direction of arrow 116. Likewise, louvers 114 and panel 112 are angled to vector vapor flow in the direction of arrow 118. The select vapor and liquid flow then occurs across the panels 120, 122 and 124 to the opposite downcomer. A downcomer panel 126 is shown sloped downwardly to a bottom discharge plate 128 in which rectangular apertures 130 are formed in the outermost section thereof. In this manner, the flow path of discharged liquid is maximized across the tray. Maximizing the length of travel of the liquid maximizes the tray efficiency, which aspect is labeled beneath the drawing of FIG. 6.

Figure 7:
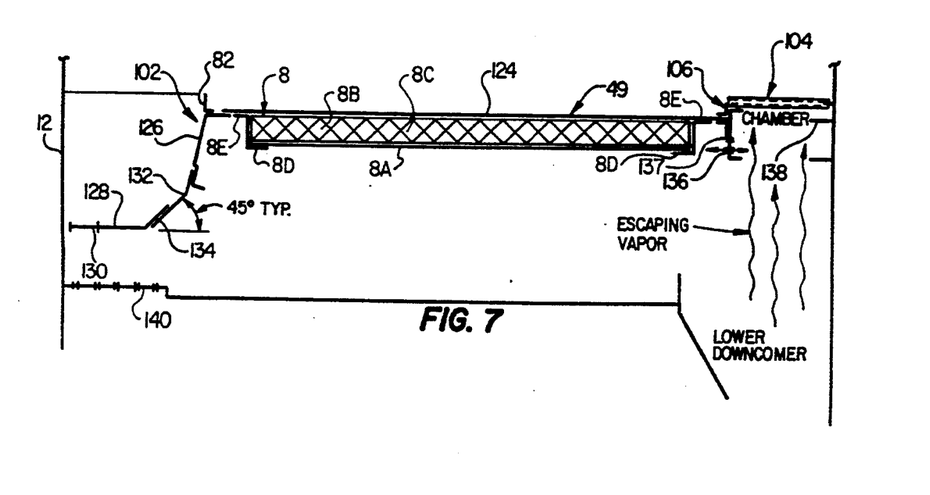
FIG. 7 is a side elevational, diagrammatic view of one embodiment of a mounting configuration for a catalyst layer in accordance with the principles of the present invention.

Referring now to FIG. 7, there is shown a side elevational, cross sectional view of the tray 49 of FIG. 6. The weir 82 is shown to be constructed of a generally L-shaped member adjacent the downcomer 102. The downcomer 102 on the left side of FIG. 7 is constructed with first sloping wall 126 which engages a second angulated sloping wall region 132. The angulated wall region 132 has a mitered section 134 which permits egress of ascending vapor from the raised panel therebeneath with a horizontal flow vector. An angulated downcomer may be provided in this vicinity for effecting vapor passage from the raised inlet panel. The raised inlet panel 104 on the right side of FIG. 7 illustrates the orientation of this preferential vapor flow area immediately above the downcomer disposed therebelow. Gas entrained in liquid which flows into the downcomer and is released must find a region of escape. The escaping vapor is illustrated rising up to and through the panel 104 where it is preferentially vented. A support beam 136 is shown to form a chamber beneath the panel 104. Apertures 137 are formed through the side wall of beam 136 to serve as vapor flow equalization holes. If excessive vapor fills the chamber beneath panel 104 it can escape outwardly through flow equalization holes 137.

Referring still to FIG. 7 there is shown one mounting configuration for a catalyst layer 8. The mounting configuration comprises a detachable metal grate 8A which is manufactured to the dimensions of an active tray panel such as panel 124. The catalyst media 8B is then placed upon the metal grate 8A and retained within a wire screen or mesh material 8C. The metal grate 8A is connected to the active tray panel 124, or the like, by support brackets 8D. The support brackets 8D shown herein are angulated members which are secured along an edge 8E to tray panel 124 by spot welding, threaded fasteners, or the like. Other bracket styles and attachment systems could, of course, be used in accordance with the principles of the present invention.

Referring still to FIG. 7 the principles of the present invention include catalyst media secured within an appropriate housing that is disposed within the proper zone of a chemical process tower. Only one such assembly is shown in FIG. 7 and many others are possible. The catalyst media 8B may comprise a heterogeneous catalyst, or the like, which is secured within a grating material, such as screen 8C, having a high percentage open area and configured in the form of the cage shown to retain catalyst therein. As described below, catalyst bales may be used in housings disposed beneath trays as in FIG. 7 as well as in enlarged vapor risers located in collector trays or vapor distributors hereinafter described.

Figure 8:
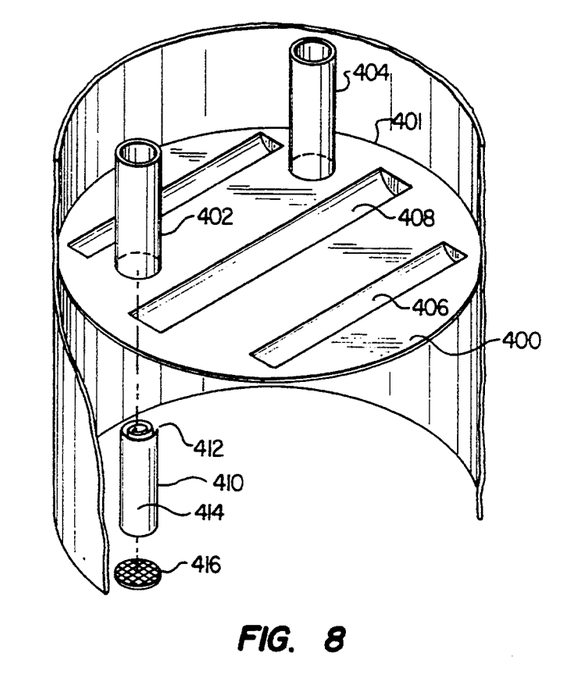
FIG. 8 is an exploded perspective view of another embodiment of a catalyst assembly constructed in accordance with the principles of the present invention.

Referring now to FIG. 8 there is shown an exploded perspective view of a tray assembly 400 within a process column 10. The tray assembly 400 includes a tray deck 401 and vapor risers 402 and 404 assembled thereon. Adjacent the vapor risers 402 and 404, a pair of liquid collection troughs 406 and 408 are illustrated. The vapor risers 402 and 404 and the liquid collection troughs 406 and 408 work together for directing and collecting the flow of vapor and liquid therethrough.

The assembly of vapor risers and liquid collection troughs, as shown herein, are conventional in and of themselves. What is not conventional is the utilization of catalyst media disposed inside the vapor riser as hereinafter described.

Referring still to FIG. 8, catalyst bales 410 are disposed within the vapor risers 402 and 404 which, in the present embodiment, are preferably enlarged and adapted to be removable from the tray 400. The enlarged vapor risers 402 and 404, and their removability feature, provide a much more convenient and cost effective manner of replacing deactivated catalyst bales 410 without removing complete tray sections from the tower 10. To effect this assembly, catalyst bales 410, as shown herein, comprise spiral wound, removable catalyst assemblies. In such an embodiment, the appropriate catalyst media 412 is disposed within a mesh blanket 414 and assembled in a spiral wound configuration for insertion into the respective vapor risers 402 and 404. The mesh blanket 414, in the spiral configuration, is supported in the vapor riser 402 or 404 by an open grate 416 disposed at the bottom of said vapor riser. The open support grate 416 may be attached by bolts to the vapor riser to complete the assembly. In this configuration removal of the vapor riser 402 and 404 from the tray deck 401 will facilitate necessary maintenance and exchange of fresh catalyst media 412. As described herein, this assembly creates less turbulence and facilitates the handling of vapors generated from an exothermic reaction. The control of the chemical reaction in the tower may thus be more precise with distinct and separate zones of catalyst media.

Figure 9:
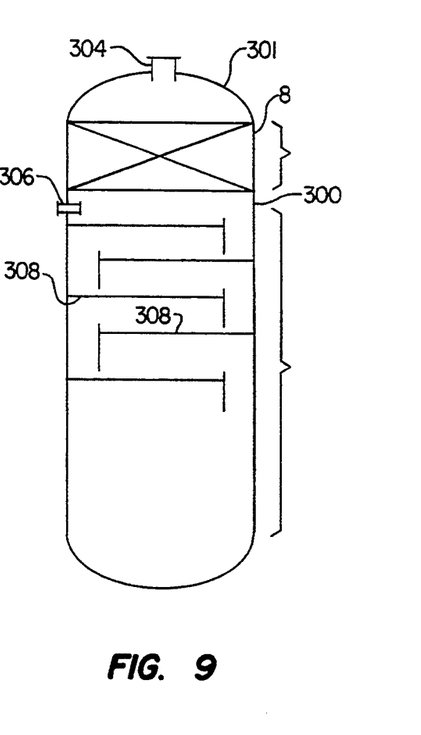
FIG. 9 is a side elevational, diagrammatic view of one embodiment of a process column incorporating an alternative position of a catalyst layer mounted therein and constructed in accordance with the principles of the present invention.

Referring now to FIG. 9 there is shown a side elevational, diagrammatic view of a process column 300 having a catalyst assembly 8 installed in an alternative position therein and assembled in accordance with the principles of the present invention. In this diagrammatical representation, the catalyst layer 8 is installed in an upper reaction zone 301 of the tower 300. The reaction zone 301 is disposed beneath the vapor outlet 304 and above the vapor or liquid feed 306. A plurality of trays 308 are diagrammatically shown for illustrating a mechanism for interacting the opposed flow of vapor and liquid therethrough. In this particular region, the catalyst layer 8 is disposed in an exclusively vapor phase region of the tower 300 to therein eliminate the need for a separate reactor vessel where vapor phase reaction of the overhead stream is desired to be effected. This embodiment is an alternative means for applying the inventive concept as set forth in the present invention by installing the catalyst in the top most vapor zone 301 of the column 300. As shown herein, the catalyst 8 is positioned across the entire cross section of the tower. The catalyst 8 may be supported by a conventional support grate, of the type discussed above. In this position it may be seen that more efficient use of process integration is provided by avoiding the need to revaporize a stream to effect the vapor phase reaction. In the case of an exothermic reaction, additional heat recovery may be realized for condenser systems (not shown) which generate process steam. In the case of an endothermic reaction, the required duty and size of the overhead condenser (not shown) can be less and reduce the capital cost and the cost of operation.

Figure 10:
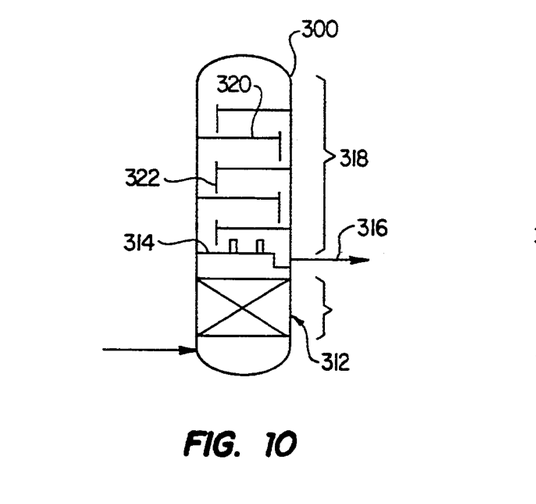
FIG. 10 is a side elevational, diagrammatic view of another embodiment of a process column incorporating an alternative position of a catalyst layer mounted therein and constructed in accordance with the principles of the present invention.

Referring now to FIG. 10 there is shown the installation of the catalyst layer 8 in a lower region 312 of tower 300. In this lower region 312, the catalyst layer 8 is disposed beneath a liquid collector tray 314 wherein liquid product or reboiler feed is removed by conduit 316. A mass transfer zone 318 is illustrated by a plurality of trays 320 and downcomers 322 disposed in the upper region of the tower 12. In this position, the catalyst layer 8 is used in yet another zone of the vessel 300 where mass transfer operations and reaction operations are occurring simultaneously and where the catalyst reaction operation occurs substantially in the vapor phase. Again, consistent with the principles of the present invention, the reaction zone 312 is substantially in a vapor phase environment in the tower 300 while vapor/liquid contact occurs in the separate zone thereabove. It may be seen that the substantially vapor phase environment may thus be disposed either in the upper most or lower most region of the tower 12.

Figure 11:
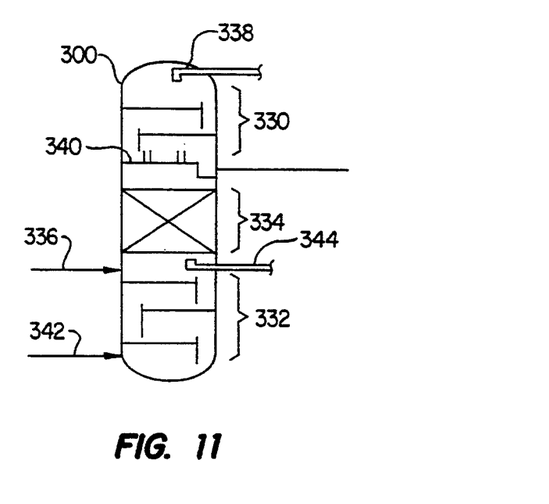
FIG. 11 is a side elevational, diagrammatic view of yet a further embodiment of a process column incorporating an alternative position of a catalyst layer mounted therein and constructed in accordance with the principles of the present invention.

Referring now to FIG. 11 there is shown yet another embodiment of the present invention wherein the catalyst layer 8 is disposed in an intermediate region of the tower 300. As shown in FIG. 11, mass transfer zones 330 and 332 are disposed in the upper and lower regions, respectively, of the tower above and below an intermediate reaction zone 334. Liquid feeds 336 and 338 are thus disposed below and above the catalyst layer 8, respectively. A separate liquid collector tray 340 is disposed above the reaction zone 334 while a vapor feed or reboiler return 342 is disposed in the lower most region of the tower 300. As seen in these views, immediately below the reaction zone 334 a vapor feed 344 can be utilized as in the case of an added reaction component or vaporized feed mixture or reboiler return. A liquid vapor mixture which flashes into the column or liquid feed or reflux stream may also be incorporated. However the distinguishing feature of the present invention is that the reaction zone 334 is substantially in a vapor phase environment while vapor/liquid contact occurs in a separate zone of the vessel.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

What is claimed is:

1. An improved tray assembly for a process column of the type utilizing catalyst media therein and wherein liquid flows downwardly through at least a first downcomer onto a first tray and across the active area thereof through which vapor flows upwardly for interaction and mass transfer with the liquid before passing therefrom by at least a second downcomer, wherein the improvement comprises means associated with said tray for the support of catalyst media therebeneath for facilitating the interaction between vapor rising upwardly through said tray and said catalyst media, and wherein said catalyst support means comprises a basket secured to the underside of said tray by attachment members.

2. The apparatus as set forth in claim 1 wherein said basket comprises a plurality of elongated wire sections configured for securement to said underside of said tray in engagement therewith for disposing said catalyst media in the vapor flow region thereof.

3. The apparatus as set forth in claim 1 wherein said attachment members comprise a plurality of angulated brackets secured at one end to said trays and configured at an opposite end for connection to said baskets.

4. The apparatus as set forth in claim 3 wherein said opposite end of said brackets include demountable couplings for securing said baskets thereto and facilitating the removal of said baskets from said tray for replacement of catalyst media therein.

5. An improved tray assembly for a process column of the type utilizing catalyst media therein and wherein liquid flows downwardly through at least a first downcomer onto a first tray and across the active area thereof through which vapor flows upwardly for interaction and mass transfer with the liquid before passing therefrom by at least a second downcomer, wherein the improvement comprises:

means associated with said tray for the support of catalyst media therebeneath for facilitating the interaction between vapor rising upwardly through said tray and said catalyst media;

means for disposing said catalyst media in a region of said column devoted substantially to vapor flow therein and the exclusion of liquid flow therethrough whereby the reaction step of said product is substantially confined to the vapor phase; and said process column being constructed with a plurality of trays disposed therein for facilitating the flow of liquid thereacross and the upward flow of vapor therethrough and wherein said catalyst media is disposed within vapor risers formed upon said trays.

6. The apparatus as set forth in claim 5 wherein said column is constructed with a plurality of trays having a plurality of vapor risers disposed thereon for channeling upwardly the ascending flow of vapor within said column and wherein said catalyst media is disposed within said vapor risers in discrete assemblies.

7. The apparatus as set forth in claim 6 wherein said catalyst media disposed within said vapor risers is formed in elongated blankets which are rolled into a generally spiral configuration and inserted within said vapor risers for interaction with the ascending vapor flow therethrough.

8. An improved catalyst media assembly for a process column of the type utilizing catalyst media therein for the enhancement of product interaction therethrough, said column being of the type wherein liquid flows downwardly to engage vapor flowing upwardly for interaction and mass transfer with said liquid, wherein the improvement comprises:

means for disposing said catalyst media in a region of said column devoted substantially to vapor flow therein and the exclusion of liquid flow therethrough whereby the reaction step of said product is substantially confined to the vapor phase;

said process column being constructed with a plurality of trays disposed therein for facilitating the flow of liquid thereacross and the upward flow of vapor therethrough; and said catalyst media being mounted within baskets secured to the underside of said catalyst trays for receiving the upward flow of vapor therethrough.

9. The catalyst media assembly as set forth in claim 8 wherein said column is constructed with a plurality of trays adapted for the flow of liquid thereover and the ascending flow of vapor therethrough and wherein said catalyst media is disposed within at least one removable basket attached to the underside of at least one of said trays.

10. The catalyst media assembly as set forth in claim 9 wherein said basket comprises a plurality of elongated wire sections configured for securement to said underside of said tray in engagement therewith for disposing said catalyst media substantially in the vapor flow region thereof.

11. The catalyst media assembly as set forth in claim 10 wherein said removable baskets are attached to the underside of at least one of said trays by attachment means comprising a plurality of angulated brackets secured at one end to said trays and configured at an opposite end for attachment to said baskets.

12. The catalyst media assembly as set forth in claim 11 wherein said opposite ends of said brackets include demountable couplings for securing said baskets thereto and facilitating the removal of said baskets from said tray for replacement of catalyst media therein.

13. An improved method of utilizing catalyst media within a process column of the type utilizing said catalyst media for the enhancement of product interaction therethrough, said column being of the type wherein liquid flows downwardly to engage vapor flowing upwardly for interaction and mass transfer with said liquid, wherein the improvement comprises the steps of:
    disposing said catalyst media in a region of said column devoted substantially to vapor flow therein;
    substantially excluding liquid flow through said catalyst media whereby the reaction step of said product is substantially confined to the vapor phase;
    constructing said process column with a plurality of trays disposed therein for facilitating the flow of liquid thereacross and the upward flow of vapor therethrough;
    disposing said catalyst media beneath said trays substantially in the vapor region of said column;
    providing baskets for securement to the underside of said trays; and
    mounting said catalyst media within said baskets beneath said trays for receiving the upward flow of vapor therethrough.

14. The method as set forth in claim 13 and further including the step of constructing said column with trays having vapor risers disposed therein and the step of channeling the ascending flow of vapor within said column through said vapor risers and the step of disposing said catalyst media within said vapor risers.

15. The method as set forth in claim 14 and further including the steps of forming said catalyst media in elongated sections, securing said sections in elongated screens, rolling said screens into spiral configurations and inserting said spiral configurations into said vapor risers.

16. An improved tray assembly for a process column of the type utilizing catalyst media therein and wherein liquid flows downwardly through at least a first downcomer onto a first tray and across the active area thereof through which vapor flows upwardly for interaction and mass transfer with the liquid before passing therefrom by at least a second downcomer, wherein the improvement comprises means associated with said first tray for the housing of and support for said catalyst media beneath said tray and in direct association therewith and secured away from said liquid flow and in a position for exposure substantially to vapor flow about said tray for facilitating the interaction between vapor rising upwardly through said tray and said catalyst media in a substantially vapor-only phase immediately adjacent said tray.

17. The apparatus as set forth in claim 16 wherein said catalyst support means comprises a basket secured to the underside of said tray by attachment members.

18. The apparatus as set forth in claim 17 wherein said basket comprises a plurality of elongated wire sections configured for securement to said underside of said tray in engagement therewith for disposing said catalyst media in the vapor flow region thereof.

19. The apparatus as set forth in claim 17 wherein said attachment members comprise a plurality of angulated brackets secured at one end to said trays and configured at an opposite end for connection to said baskets.

20. The apparatus as set forth in claim 19 wherein said opposite end of said brackets include demountable couplings for securing said baskets thereto and facilitating the removal of said baskets from said tray for replacement of catalyst media therein.

21. The apparatus as set forth in claim 16 wherein said process column is constructed with a plurality of trays disposed therein for facilitating the flow of liquid thereacross and the upward flow of vapor therethrough and wherein said catalyst media is disposed within vapor risers formed upon said trays.

22. The apparatus as set forth in claim 21 wherein said column is constructed with a plurality of trays having a plurality of vapor risers disposed thereon for channeling upwardly the ascending flow of vapor within said column and wherein said catalyst media is disposed within said vapor risers in discrete assemblies.

23. The apparatus as set forth in claim 22 wherein said catalyst media disposed within said vapor risers is formed in elongated blankets which are rolled into a generally spiral configuration and inserted within said vapor risers for interaction with the ascending vapor flow therethrough.

* * * * *